Sept. 14, 1965   J. E. SWANEKAMP ETAL   3,206,612
SIGNAL TIME COMPARISON CIRCUIT UTILIZING UJT CHARACTERISTICS
Filed Aug. 18, 1960   3 Sheets-Sheet 3

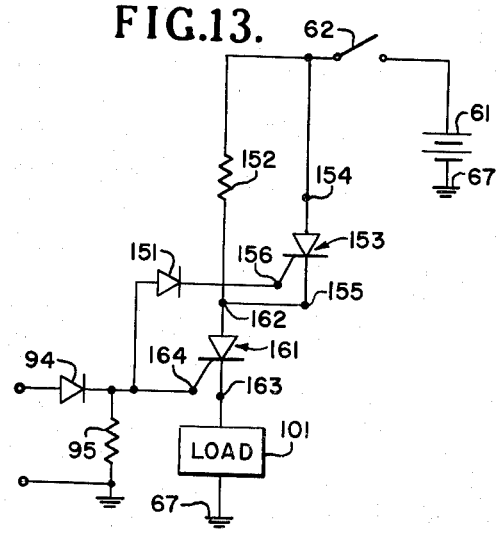
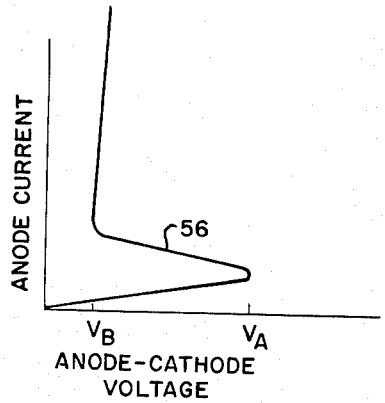
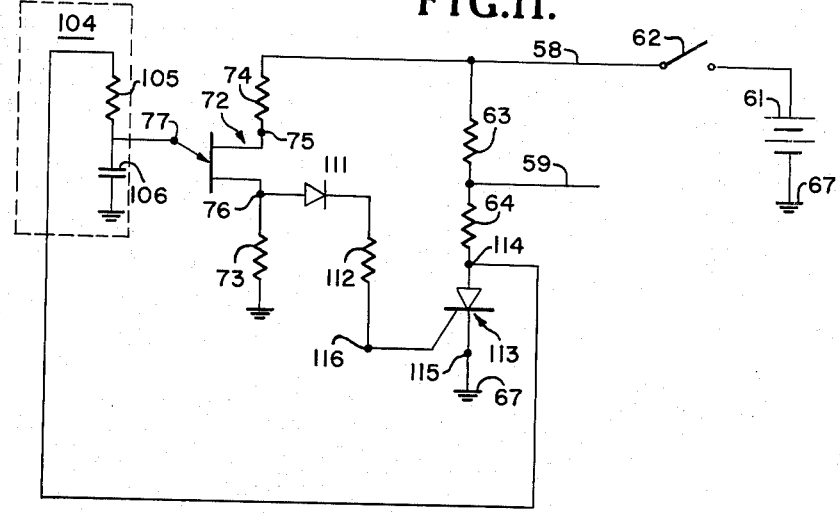

INVENTORS.
J. E. SWANEKAMP
R. R. WILSON
BY
ATTYS.
AGT.

United States Patent Office 3,206,612
Patented Sept. 14, 1965

3,206,612
SIGNAL TIME COMPARISON CIRCUIT UTILIZING
UJT CHARACTERISTICS
James E. Swanekamp, Rockville, and Robert R. Wilson,
Chillum, Md., assignors to the United States of America
as represented by the Secretary of the Navy
Filed Aug. 18, 1960, Ser. No. 50,554
4 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

The invention relates to a system for actuating a load after a comparison has been made with a signal and another signal indicative of time.

In addition, this invention relates to a circuit for producing an impulse a predetermined period after it has been actuated.

Also, this invention relates to a circuit which will not actuate a load in response to a transient voltage applied thereto.

It is an object of this invention to provide a system that will actuate a load if an input signal of a predetermined magnitude is supplied thereto prior to a certain time after the apparatus has been actuated, and which will actuate a load subsequent to the stated time for a different predetermined input signal.

It is another object of this invention to provide a system for actuating a load when an input signal having a value greater than a predetermined value occurs prior to a certain time and for actuating that load when a signal having a second predetermined value which is less than the first predetermined value occurs subsequent to that specific time.

An additional object of this invention is to provide a new and improved circuit which will not actuate a load regardless of the input thereto until a predetermined period of time elapses from the time the circuit is initially energized.

A further object of this invention is to provide a new and improved circuit for producing an impulse a predetermined period of time after a circuit has been actuated.

A still additional object of this invention is to provide a new and improved circuit that will not actuate a load in response to a transient effect but which will actuate the load in response to a proper signal.

A still further object of this invention is to provide a new and improved fail safe circuit; i.e. one which will actuate a load if the input signal is no longer being applied to the circuit.

Various other objects and advantages will appear from the following description of several embodiments of the invention, and the novel features will be particularly pointed out hereinafter in connection with the appended claims.

The present invention contemplates the solution of these objects by the use of many recently introduced semiconductor components, such a double base diodes or unijunction transistors, Shockley diodes, and silicon controlled rectifiers. These elements are connected in such a manner as to develop an impulse a predetermined period of time after the circuit has been actuated. The developed impulse is compared with an amplitude varying input signal. In certain embodiments of the invention the comparison apparatus is arranged so that an output is obtained therefrom if the input signal is greater than a predetermined value prior to the occurrence of the developed impulse or it will produce an output if a smaller amplitude input signal is coupled thereto subsequent to the occurrence of the developed impulse. In another embodiment of the invention, the comparison device cannot be actuated prior to the occurrence of the developed impulse, but it will be actuated by signals having an amplitude greater than a predetermined value subsequent to the occurrence of the developed time responsive impulse.

The novel circuit utilized to produce an impulse a predetermined period of time after the circuit has been energized contains an integrator which is charged by the power supply of the system. The output of the integrator circuit is coupled to the emitter of a double base diode which is normally conducting little or no base to base current. When the integrator output reaches a predetermined value the double base diode is energized producing a pulse which is supplied to a semiconductor switching network. The switching circuit comprises either a silicon controlled rectifier or a Shockley diode. The input to the integrator circuit may be supplied either through an impedance coupled to the controlled rectifier or directly from the circuit power supply.

The unique circuit employed to prevent actuation of the load by the transient resulting from initial circuit actuation comprises a silicon controlled rectifier which is connected to the power supply switch by way of a suitable impedance. A switching mechanism which also may take the form of a silicon controlled rectifier is connected in parallel with the impedance. A diode is connected between the gate or control electrodes of both silicon controlled rectifiers and is supplied by a suitable pulse producing circuit. The load is connected to the cathode of the silicon controlled rectifier. Since the load is of the type such as an explosive primer, which is actuated only once by the desired signal, it cannot be energized by any resulting transient.

Reference is now made to the accompanying drawings in which:

FIG. 9 is a plot of the characteristic curve of the diode illustrated in FIG. 7;

FIG. 11 is a schematic circuit diagram of a portion of another preferred embodiment of this invention;

FIG. 13 is a schematic diagram of a preferred form of the circuit designed to prevent actuation of a load by transient voltages.

It is to be understood that like reference numerals throughout the several views of the drawings represent like or corresponding parts throughout the specification.

Figure 1:
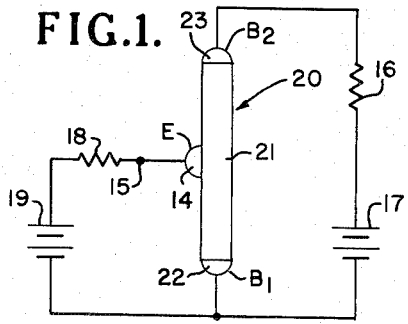
FIG. 1 is a circuit diagram of the connections of a double base diode or unijunction transistor.

Referring now to FIG. 1 of the drawings whereon is shown a circuit diagram of the conventional manner in which a double base diode is connected. The double base diode 20 comprises an elongated slab of N-type semiconductor material and a rectifying junction that is formed by the application of a suitable type of P-type semiconductor material at the point 14. The connection to the P-type semiconductor is shown at terminal 15 and is commonly referred to as an emitter electrode while the terminals 22 and 23 on the N-type material will be referred to as base 1 ($B_1$) and base 2 ($B_2$), respectively. The construction of double base diodes is described in U.S. Patent No. 2,769,826 issued to Lesk.

In the convention circuit, battery 17 and resistor 16 are connected between the two base terminals 22 and 23. The emitter is biased forward with respect to base $B_1$ by means of battery 19 and resistor 18 which are connected between terminals 15 and 22.

Figure 2:
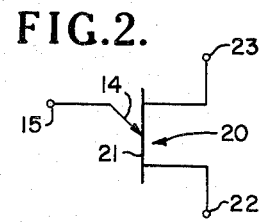
FIG. 2 is a diagrammatical illustration of the double base diode shown in FIG. 1.

The symbolism which is being adapted prevalently for the double base diode is shown in FIG. 2.

The double base diode is shown generally as 20 in the figure. The N-type material by the straight line 21 while the first base ($B_1$) is shown as terminal 22 and the second base terminal ($B_2$) is shown as terminal 23. The emitter is illustrated as arrow 14 and the emitter terminal is illustrated as 15.

Figure 3:
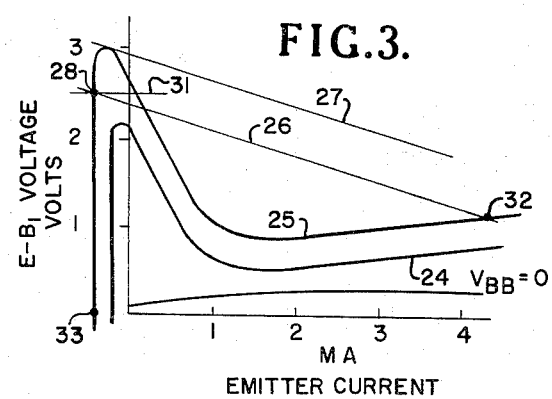
FIG. 3 is a plot of the characteristic curves of the double base diode shown in FIG. 1.

Referring now to FIG. 3 of the drawings whereon is illustrated a typical set of characteristic curves for the double base diode connections shown in FIG. 1. These curves will be used to describe a typical operation of the double base diode. Let it be assumed for the purpose of description that the initial operating point 28 is at the intersection of lines 26 and 31 and the characteristic curve 25 is associated with a base-to-base voltage of 6 volts. If a positive pulse with respect to base terminal 22 is applied to the emitter 14 of the double base diode, the line 26 will be displaced upward by an amount proportional to this increased voltage. It will be assumed that the increased voltage is sufficient to displace the line 26 to line 27 and that the peak point on the curve 25 will be reached. When the pulse is removed, however, current flows from emitter 14 to base 22 and will continue to increase until the double base diode saturates at the point of intersection 32 between lines 26 and 25 in the conducting region. Also the current flow from base 23 to base 22 will be substantially increased when the voltage on emitter 14 is increased above the peak point. Thus the double base diode acts as a switching element which will continue to conduct heavily even after an impulse of proper magnitude to actuate it has been removed.

Figure 4:
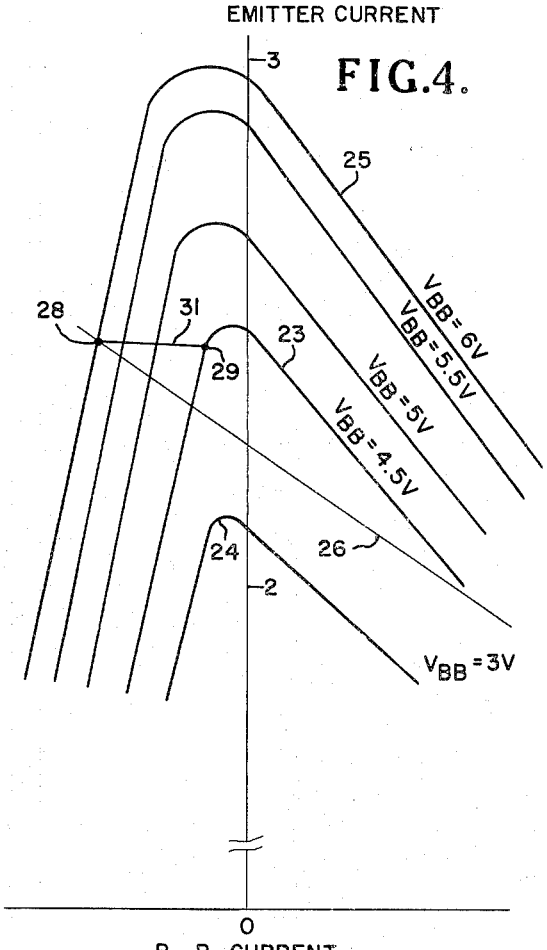
FIG. 4 is a greatly enlarged portion of part of the characteristic curves illustrated by FIG. 3, the abscissa cordinates being enlarged more than the ordinate coordinates.

Refer now to FIG. 4 of the drawings, which illustrates how a double base diode can be made responsive to smaller magnitude base to emitter voltages. It will again be assumed that the biasing voltages are such that the initial operating point 28 is at the intersection of lines 31 and 26 and the characteristic curve 25 associated with a base-to-base voltage of 6 volts. If the base-to-base voltage is decreased from 6 volts to 4.5 volts by some suitable means, the initial operating point will be at the intersection 29 of line 31 and the characteristic curve 23 associated with a base-to-base voltage of 4.5 volts. With the double base diode voltages fixed to that the initial operating point is shown at 29, it should be apparent that the emitter voltage necessary to drive the double base diode from a substantially non-conducting region to saturation will be considerably less than if the base-to-base voltage was 6 volts and the initial operating point was at 28. This is because the peak of the characteristic curve 23 occurs at considerably smaller voltage than the peak associated with characteristic curve 25. Thus, the double base diode may be used as a convenient comparison network which will conduct heavily once the proper magnitude voltages which are to be compared are applied.

Figure 5:
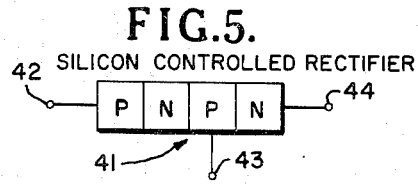
FIG. 5 is a diagrammatical illustration of a gated or slilcon controlled rectifier.
Figure 6:
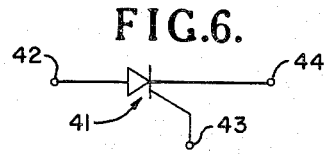
FIG. 6 is the electrical symbol for the rectifier shown in FIG. 5.

Referring now to FIG. 5 wherein is illustrated a diagrammatical representation of a gated or silicon controlled rectifier 41. This rectifier comprises four semiconductor elements, two being of the P-type and the other two being N-type. One of the N-type semiconductor elements is sandwiched between two of the P-type materials and the other N-type element is fused to the interior P-type semiconductor element. The anode terminal 42 is connected to the exterior P-type semiconductor while the cathode terminal 44 is connected to the exterior N-type material. The gate terminal 43 is connected to the interior P-type element. The conventional representation for the silicon controlled or gated rectifier is shown in FIG. 6.

This semiconductor element functions in a manner similar to that of a thyratron tube. The rectifier will be normally non-conductive and hence will present a very high impedance between terminals 42 and 44. However, once a sufficiently large amplitude positive pulse is applied to the gate terminal 43, the rectifier will be rendered conductive and the element will be rendered conductive as long as a positive voltage is applied to anode terminal 42.

Figure 7:
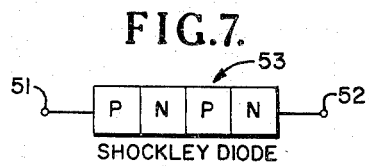
FIG. 7 is a diagrammatic illustration of a Shockley diode.

Referring now to FIG. 7 of the drawings whereon is shown a diagrammatical representation of a controlled switching element 53 or what is commonly referred to as a Shockley diode. This semiconducting element has an anode 51 connected to one of the exterior P-type semiconductor elements and a cathode 52 connected to the exterior N-type semiconductor material. N and P type semiconductor elements are sandwiched between the anode and cathode.

Figure 8:
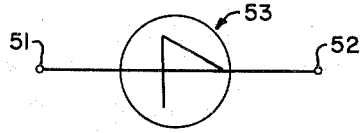
FIG. 8 is the electrical symbol for the diode shown in FIG. 7.

FIG. 8 of the drawings illustrates a conventional manner of schematically showing a Shockley diode which is shown generally at 53 while the terminal 51 is connected to the anode and terminal 52 to the cathode.

FIG. 9 of the drawings discloses a typical characteristic curve 56 for a Shockley diode. The element will be normally a high impedance between the anode and cathode terminals until the voltage $V_A$ is reached because very little current is able to flow through it. However, as soon as the anode-to-cathode voltage reaches or exceeds the point $V_A$ the diode will become virtually a short circuit and will pass very large anode currents with a small voltage applied across it. Once the input voltage exceeds the value $V_A$ the semiconductor switch will rapidly assume a substantially constant voltage, $V_B$, across it, because the element is unable to remain in the unstable negative impedance range. The value of the voltage $V_A$ at which the Shockley diode breaks down and conducts heavily, can be varied by the use of proper manufacturing techniques. The method of manufacture and complete operation of this device is more fully described in U.S. Patent No. 2,855,524 issued to William Shockley.

Figure 10:
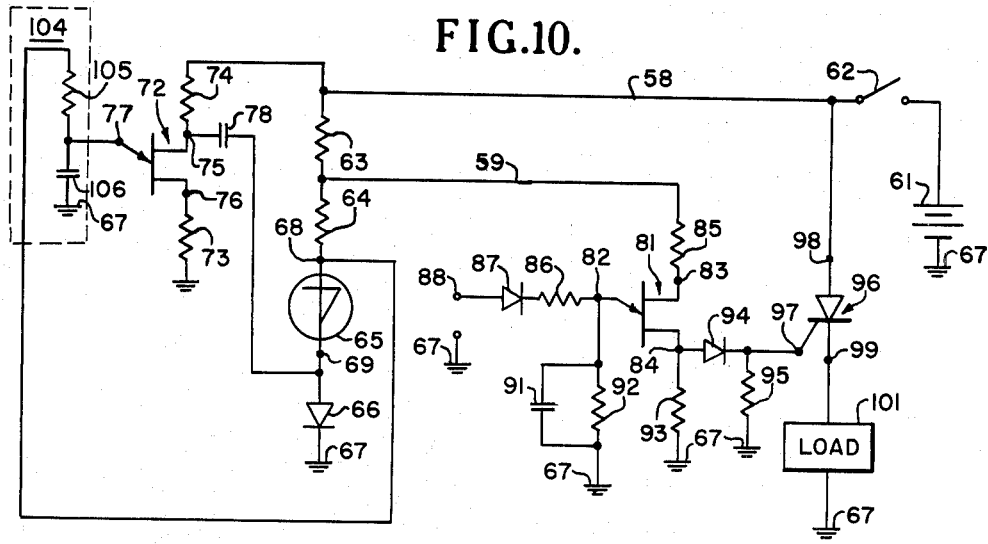
FIG. 10 is a circuit diagram of one preferred embodiment of this invention.

Referring now to FIG. 10 of the drawings, there is disclosed a preferred embodiment of this invention in which load 101 will be actuated by a relatively large signal applied to terminal 88 prior to a predetermined period of time after switch 62 is closed; but which will permit actuation of load 101 by a smaller voltage on terminal 88 after the predetermined period of time has elapsed. A suitable power supply such as battery 61 is connected between ground 67 and one terminal of the switch 62. The armature of switch 62 is connected to an integrating circuit 104 by way of lead 58 and resistors 63 and 64. The integrating circuit 104 is of the conventional resistance capacitance type and comprises resistor 105 and condenser 106 which is connected to ground terminal 67. The output of the integrator circuit is obtained across capacitor 106 and is fed to the emitter terminal 77 of double base diode 72. One of the base electrodes of double base diode 72 is connected to lead 58 by way of resistor 74 and base terminal 75 while the other base terminal 76 is connected to ground by way of resistor 73.

Base terminal 75 of double base diode 72 is connected to the cathode 69 of Shockley diode 65 by way of coupling capacitor 78. The anode 68 of the Shockely diode is connected to resistor 64 and to the resistor 105 of the integrator circuit 104. The cathode 69 of the Shockley diode is coupled to ground 67 by way of conventional diode 66.

Prior to closing of switch 62 there will be virtually no charge on capacitor 106 of the integrator circuit 104. Consequently, the voltage between the base terminal 76 and emitter terminal 77 of double base diode 72 will be small, and little current will flow through diode 72. After switch 62 is closed, capacitor 106 begins to charge up and the voltage between terminals 76 and 77 will increase. This voltage increases until the peak value of a characteristic curve, such as shown on FIG. 3, is reached at which point the double base diode will be rendered conductive. When this occurs, the voltage on terminal 75 is lowered because of the current flowing through resistor 74. The resulting impulse is coupled to the cathode 69 of Shockley diode 65 by way of capacitor 78.

The shockely diode 65 was formerly non-conducting or in its high impedance state because there was insufficient voltage across it to permit actuation thereof. When the negative impulse produced by the energization of double base diode 72 is fed to the cathode 69 of Shockley diode 65, the resulting voltage across that switching element will be sufficient to drive it beyond its breakdown voltage and additional current will accordingly flow through resistors 63 and 64 and the potential of anode 68 will be considerably lowered. With the additional surge of current through resistors 63 and 64, a drop in voltage which may be considered a negative impulse is suddenly produced on lead line 59.

Thus it is apparent that integrator circuit 104 and the connections to double base diode 72 and Shockley diode 65 form a circuit for producing an impulse a predetermined period of time after the circuit has been actuated by closure of switch 62. This time interval between the closing of switch 62 and the generation of the impulse on lead 59 may be varied by properly selecting the components utilized in the circuit, particularly those in the integrator circuit.

The output between potential dividers 63 and 64 is supplied to one of the base terminals 83 of double base diode 81 by way of resistor 85 and lead 59. An independent input signal, preferably an A.C. voltage, is coupled to the emitter terminal 82 of double base diode 81 by way of resistor 86, diode 87 and input terminal 88.

The emitter terminal 82 of the double base diode is biased in a forward direction by resistor 92 and capacitor 91 connected in parallel thereto, both of which are connected to ground, as well as by diode 87 and resistor 86 which rectify the independent input signal and establish a D.C. bias across capacitor 91. The other base terminal 84 of this double base diode is connected to ground by way of resistor 93 and is also connected to the anode of conventional diode 94. The cathode of diode 94 is coupled to a shunting resistor 95 and to the gate or control terminal 97 of the switching element or silicon controlled rectifier 96. The anode terminal 98 of the controlled rectifier is connected to the armature of switch 62 while the cathode of this switching element is connected to a suitable load device 101, which may take the form of the primer of an explosive train. The other terminal of the load circuit is connected directly to ground.

Prior to the occurrence of the negative impulse on lead 59, double base diode 81 will be at a point considerably below the peak of a particular characteristic curve, as shown by point 28, FIG. 3. When double base diode 81 is initially at this point a fairly large input signal must be applied to terminal 88 to cause heavy conduction through the base terminals 83 and 84. If the input voltage applied to terminal 88 is of sufficient magnitude to energize double base diode 81, a positive impulse will be obtained at the base terminal 84 due to the increased current flow through resistor 93. This positive impulse will be coupled through diode 94 to the control element of the gated rectifier causing the semiconductor switch 96 to conduct heavily and actuate the load 101. Prior to generation of the impulse at the base terminal 84 the silicon controlled rectifier will be virtually an open circuit and will pass no current to the load thereby disabling it until the occurrence of the pulse on terminal 97.

If the signal applied to terminal 88 is of insufficient magnitude to actuate double base diode 81 prior to the occurrence of the impulse on lead 59, the operating point of this double base diode will be shifted along line 31 in FIG. 4 from point 28 to point 29 when the impulse generated by the timing circuit is produced. This shift in the operating point of double base diode 81 permits it to be energized and rendered conductive by a substantially smaller signal applied between terminals 88 and 67. If such a smaller signal is generated subsequent to the occurrence of the impulse on lead 59, the load 101 will be actuated in the same manner as previously described for its energization prior to the occurrence of the timing impulse. It should thus be apparent that double base diode 81 may be considered as a comparing means to produce an output impulse prior to the occurrence of the pulse generated on lead 59 when the independent signal connected to terminal 88 exceeds a first predetermined value, and also as a means for producing an output impulse subsequent to the occurrence of the pulse produced by the timing mechanism when the independent signal exceeds a second predetermined value. In the particular embodiment of FIG. 10 the first predetermined value at which the double base diode will be rendered conductive exceeds the second predetermined value.

Reference is now made to FIG. 11 of the drawings which discloses another embodiment of the timing mechanism which may be utilized in FIG. 10. This circuit is similar to that shown in FIG. 10 except that a gated or silicon controlled rectifier has been substituted for the Shockley diode. Resistors 63 and 64 connect the anode 114 of rectifier 113 to the armature of switch 62 and the positive terminal of battery 61 when the switch is closed. Integrator circuit 104 and the double base diode 72 are connected to resistor 64 in the same manner in which they are in the embodiment of FIG. 10. The base terminal 76 of double base diode 72 is connected through a rectifier 111 and resistance 112 to the control electrode 116 of the gated rectifier. The cathode 115 of this rectifier is directly connected to ground terminal 67.

When switch 62 is closed, capacitor 106 charges up to a point where double base diode 72 will be rendered conductive and the current flowing through resistor 73 will produce a resulting positive impulse on the control electrode 116 of gated recttifier 113. This positive impulse renders rectifier 113 conductive causing a substantial increase in current through resistors 63 and 64 consequently producing a negative impulse on lead 59. Lead 59 is connected to double base diode 81 of FIG. 10 and the remainder of the actuation circuitry will be identical to that of the previous embodiment.

Figure 12:
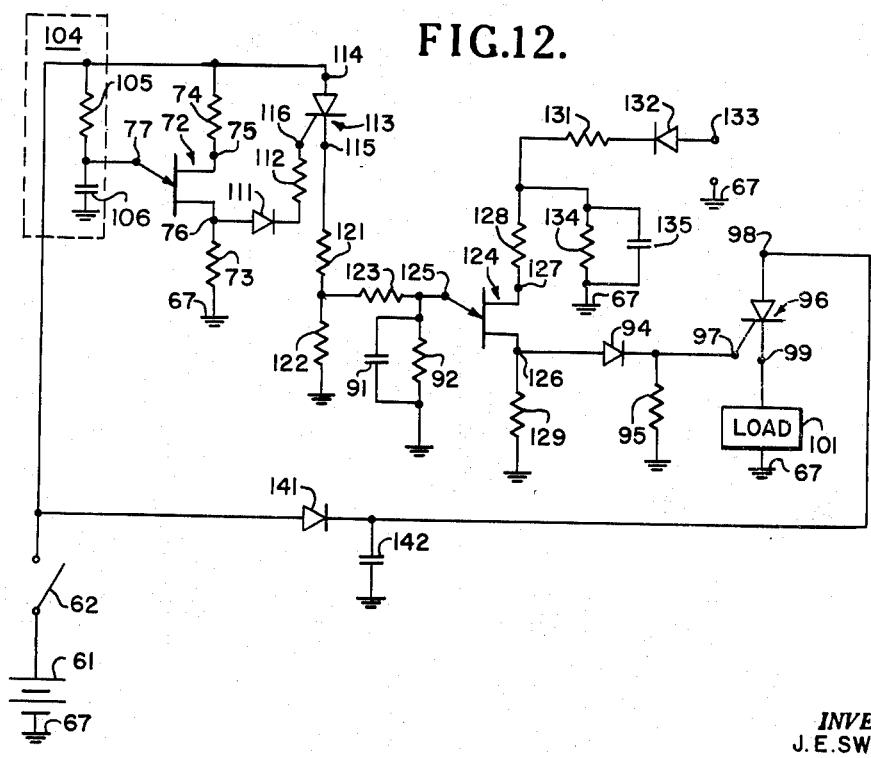
FIG. 12 is a schematic diagram of the fail-safe embodiment of this invention.

FIG. 12 of the drawings discloses another preferred embodiment of this invention which is designed to operate in a somewhat different manner than either of the embodiments of FIG. 10 or 11. With this modified structure the load 101 cannot be actuated prior to the occurrence of the timing impulse. This circuit also functions as a fail-safe circuit since load 101 will be actuated subsequent to the occurrence of the timing impulse if the signal on terminal 133 is removed. Subsequent to the occurrence of the timing impulse the load will be energized when the independent input signal on terminal 133 either equals or becomes less than a predetermined value.

The integrating circuit 104 comprising resistors 105 and 106 is connected to the positive terminal of battery 61 by means of switch 62. The output of the integrator circuit 104 across capacitor 106 is connected to the emitter terminal 77 of double base diode 72 in the same manner as disclosed in FIGS. 10 and 11. Also, the base terminal 76 of the double base diode is connected to the control electrode 116 of gated rectifier 113 in a manner identical to that shown in FIG. 11. However, the anode 114 of silicon control rectifier 113 is connected directly to switch 62 and the cathode terminal 115 is connected to ground through series connected resistors 121 and 122.

A predetermined period of time after switch 62 has been closed, determined primarily by the time constant of integrator circuit 104, silicon controlled rectifier 113 will be rendered conductive because of the switching action of double base diode 72 which applies a positive impulse to gate electrode 116. This positive impulse renders the controlled rectifier conductive and current is conducted through resistors 121 and 122 to ground. The resulting current flow raises the voltage across resistor 122, thus producing a positive impulse which is coupled to the double base diode 124.

Resistor 123 connects the junction between resistors 121 and 122 to the emitter terminal 125 of double base diode 124. Also connected to the emitter terminal of this double base diode is a biasing circuit comprising the parallel combination of resistor 92 and capacitor 91. The base terminal 127 is coupled by way of resistors 128 and 131 in addition to conventional diode 132 to terminal 133 to which an independent signal is fed. Positive bias is applied to base terminal 127 by the biasing circuit comprising resistor 134 and capacitor 135 which is connected between resistors 128 and 131 and ground 67. The diode 132 will rectify any A.C. signal appearing on terminal 133 and build up a positive biasing voltage across capacitor 135. The output of double base diode 124 is developed between base electrode 126 and ground across resistor 129. Base terminal 126 is connected to the control electrode 97 of silicon controlled rectifier 96 by way of series connected diode 94 and shunting resistor 95. The cathode 99 of rectifier 96 is connected directly to one terminal of the load 101 while the other terminal of the load is connected to ground 67. The anode 98 of gated rectifier 96 is connected to switch 62 by way of diode 141 and is also connected to charging capacitor 142. Diode 141 is designed to prevent actuation of the load 101 by transient effect produced when switch 62 is initially closed.

Prior to the occurrence of the timing pulse, emitter 125 of double base diode 124 will be maintained at almost zero voltage with respect to base 126 since substantially no current will be flowing through resistor 122 and the emitter will be substantially at ground potential. With the double base diode in this state, the operating condition will establish at a low level of base to base current, such as point 33 in FIG. 3. Under this condition the double base diode is unable to conduct current regardless of the base-to-base voltage which is applied thereto. Consequently, regardless of the magnitude of the input signal applied to terminal 133, double base diode 124 will be rendered unenergized and load 101 will not be actuated prior to the occurrence of the timing impulse.

After the timing impulse is generated, an operating point where the double base diode may be rendered conductive, such as at 28, FIGS. 3 and 4, will be assumed, provided the input signal on input terminal 133 is of sufficient amplitude to maintain the base-to-base voltage equal to an appropriate value, such as 6 volts. As the independent input signal is increased, the operating point will be displaced to the left as shown on FIG. 3 thereby maintaining the double base diode 124 in its non-conductive state. When the signal on terminal 133 decreases sufficiently so as to reach one of the peak points on a characteristic base-to-base voltage curve, double base diode 124 will be rendered conductive and the voltage on base terminal 126 will be increased.

This increased voltage supplies a positive impulse to the control electrode 97 of controlled rectifier 96 thereby rendering it conductive. When the positive impulse is applied to control electrode 97, gated rectifier 96 will be suddenly rendered capable of passing current through it. When this occurs, the charge which has been built up on capacitor 142 will be discharged through rectifier 96 to load 101 thereby causing actuation of the load. When the load is in the form of an explosive primer it is essential that a large current be passed therethrough as can be done most readily upon discharge of a large capacitor such as capacitor 142. It is thus seen that the embodiment of FIG. 12 would not permit actuation of load 101 prior to a predetermined time and will cause the load to be energized only when the independent input signal on terminal 133 is decreased to a certain predetermined value after the occurrence of the said predetermined time.

Referring now to FIG. 13 of the drawings, there is disclosed a novel circuit for preventing actuation of load 101 by a transient effect when switch 62 is closed. This circuit configuration may be substituted for the silicon controlled rectifier 96 and the associated circuitry.

Base terminals 126 or 84 of double base diodes 124 or 81, respectively, are connected to the anode of diode 94. The cathode of diode 94 is connected to the control electrode 156 of silicon controlled rectifier 153 by way of conventional diode 151 and is directly connected to the control electrode 164 of silicon controlled rectifier 161. The anode terminal 162 of gated rectifier 161 is connected to the cathode terminal 155 of gated rectifier 153 and is also connected to the armature of switch 62 by way of a suitable impedance, such as resistor 152. Since anode terminal 154 of gated rectifier 153 is directly connected to the armature of switch 62, it may be considered that controlled rectifier 153 is in parallel with resistor 152. The cathode terminal 163 is connected to one side of load 101 while the other side of the load is connected to ground terminal 67.

If a large transient voltage occurs when switch 62 is closed, controlled rectifier 161 will not be actuated because a large percentage of the transient voltage will appear across resistor 152. However, when the positive input pulse is applied to the anode of rectifier 94 it will be passed to control electrodes 164 and 156 thereby short circuiting resistor 152 and rendering both silicon rectifiers 153 and 161 in a conducting state. In this manner, load 101 will be energized by the appropriate input pulse but will not be actuated by a transient surge when switch 62 is closed.

It should now be apparent that there has been herein disclosed a plurality of circuits which will energize a load depending upon the time after the circuit has energized and the amplitude of an independent input signal fed to the circuit. There has also been disclosed a plurality of circuits which will produce an impulse a predetermined period of time after having been energized. Also a circuit which will energize a load in response to an applied input pulse but which will not actuate that load in response to a transient voltage when the system is energized has been described. All of these circuits utilize recently introduced components, such as double base diodes, Shockley diodes and silicon controlled or gated rectifiers.

It will be understood that various changes in the details, materials and arrangements of parts, which have been herein described and illustrated in order to describe the nature of the invention, may be made by those skilled in the art within the principles and scope of the invention as expressed in the appended claims.

What is claimed is:

1. An actuating system comprising means for producing only one impulse a predetermined period of time after the system has been energized, an input terminal for receiving a signal, and comparing means coupled to said one impulse producing means and to said input terminal for producing a single output impulse prior to the occurrence of said one impulse when the signal received at said input terminal exceeds a first predetermined value and for producing a single output impulse subsequent to the occurrence of said one impulse when the signal received by said input terminal exceeds a second predetermined value, said first predetermined value being of different magnitude than said second predetermined value.

2. An actuating system comprising, means for producing a single impulse a predetermined period of time after the system has been energized, a three-terminal semi-conducting comparing element, means coupled to said impulse producing means and to said semi-conducting element for feeding the impulse to one of the terminals of said element, and means coupled to another terminal of said semi-conducting element for feeding an independent amplitude varying input signal thereto, whereby an actuating signal is generated at the third terminal of said semi-conducting element prior to the occurrence of the impulse only when the independent signal exceeds a first predetermined value, and an actuating signal is generated at the third terminal of said semi-conducting element subsequent to the occurrence of the impulse only when the independent signal exceeds a second predetermined value.

3. The circuit of claim 2 wherein said three terminal semi-conducting element comprises a double base diode, the first, second, and third terminals of said element corresponding to the first base, emitter, and second base, respectively of said double base diode.

4. An actuating circuit comprising a power supply, an integrator circuit having an input and an output, first means including a switch for coupling said supply to the input of said integrator circuit, a first double base diode having an emitter connected to the output of said integrator, a first base of said double base diode connected to said switch, and a second base of said double base diode connected to a point of common potential, a Shockley diode having an anode and a cathode, said cathode being coupled to the first base of said double base diode and a rectifier connected between said cathode of said Shockley diode and the point of common potential, a pair of series conected resistors connected between said switch and said anode of the said shockley diode, a three-terminal semi-conducting element having a first terminal connected to a junction of said series connected resistor, means coupled to a second terminal of said three-terminal semi-conducting element for feeding an input signal thereto, and means coupled to a third terminal of semi-conducting element for feeding the output thereof to a load circuit.

References Cited by the Examiner

UNITED STATES PATENTS

| | | | |
|---|---|---|---|
| 2,233,810 | 3/41 | Dawson | 328—77 |
| 2,927,259 | 3/60 | Neal | 307—88.5 |
| 2,932,783 | 4/60 | Mohler | 307—88.5 |
| 2,937,289 | 5/60 | Aldrich et al. | 307—88.5 |
| 3,046,470 | 7/62 | Blocher | 307—88.5 |

OTHER REFERENCES

Article: "A Survey of Some Circuit Applications of the Silicon Controlled Switch and Silicon Controlled Rectifier," in Applications and Circuit Design Notes, published by Solid States Products, Inc., December 1959, Bulletin D420–02, pages 15–17.

Article: "A survey of Some Circuit Applications of the Silicon Controlled Switch and Silicon Controlled Rectifier," in Applications and Circuit Design Notes, published by Solid States Products, Inc., August 1959, Bulletin D420–02, pages 20–24.

"Notes on the Application of Silicon Controlled Rectifier," published by General Electric, December 1958, page 54 relied on.

"Application Data," published by Shockley Transistor Corp., October 1959, No. AD–6, page 2 cited.

ARTHUR GAUSS, *Primary Examiner*.

HERMAN KARL SAALBACH, JOHN W. HUCKERT,
*Examiners.*